July 29, 1924.
F. F. BABCOCK
METAL BORING TOOL
Filed Jan. 25, 1923
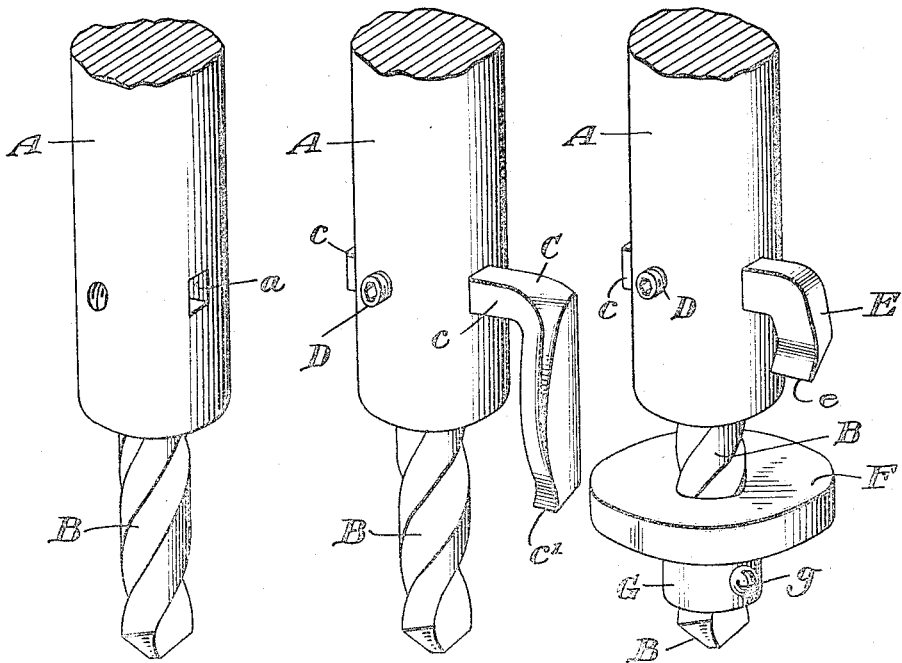
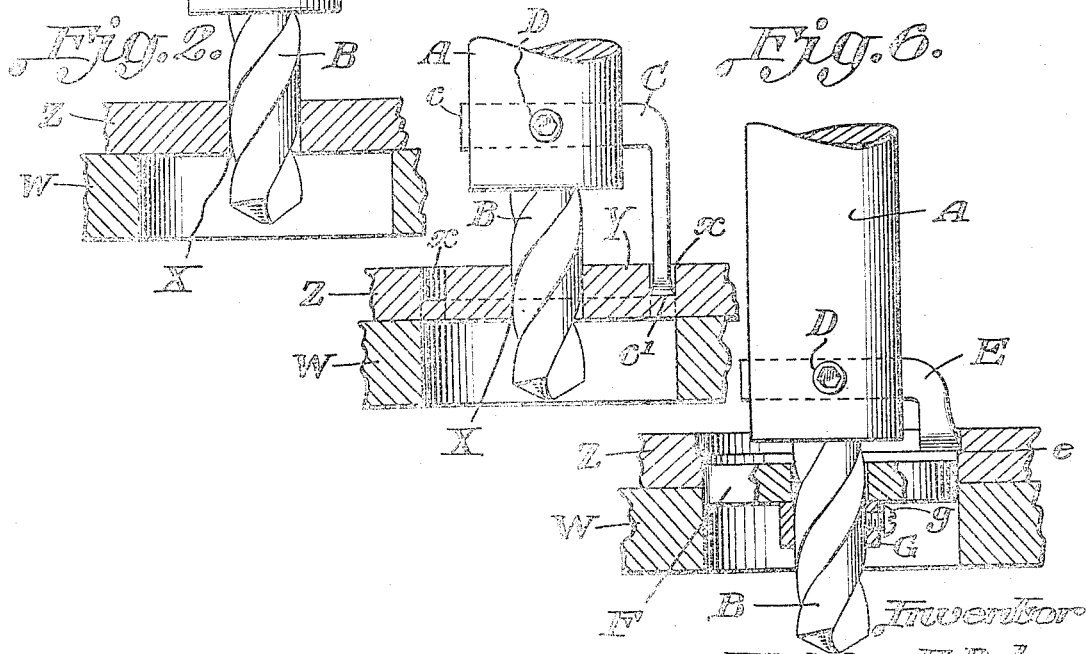

Patented July 29, 1924.

1,502,652

UNITED STATES PATENT OFFICE.

FLETCHER F. BABCOCK, OF PARSONS, KANSAS.

METAL-BORING TOOL.

Application filed January 25, 1923. Serial No. 614,780.

*To all whom it may concern:*

Be it known that I, FLETCHER F. BABCOCK, a citizen of the United States, residing in Parsons, in the county of Labette and State of Kansas, have invented certain new and useful Improvements in Metal-Boring Tools, of which the following is a specification.

This invention relates to tools for boring holes in metal of the kind in which a hole of small diameter is first made by one cutter and the hole is enlarged by another cutter, and the object of the invention is to provide a tool of this class in which the cutter for forming the large hole is so constructed and is so arranged that it may be operated by minimum power with increased speed and with the least friction.

I have provided a tool which may be used for reaming purposes or which can be employed to cut rings of desired size or grooves of different diameters.

According to my invention, I provide a tool holder in the form of a bar, carrying at its lower end a drilling bit adapted to form a relatively small hole in the piece of metal or "work" operated upon and in the tool holder, above the drill I support an L-shaped cutter, the lower end of which is formed with a cutting edge adapted to make an annular groove in the metal around the hole formed by the drilling bit. The groove forming cutter is adjustable in the tool holder, adapting it to form grooves of different diameters. The drilling bit acts as a guide or pilot for the groove cutter, enabling the latter to produce a truly circular groove. In this way metal rings or collars may be formed which may be employed for many useful purposes.

The L-shaped cutter may have its cutting edge adapted to cut an annular groove around a hole to be reamed, and in order to guide the tool during the reaming operation I employ a guide ring or pilot ring, which is loosely mounted on the bit and is held in place by a collar made fast to the bit.

In the accompanying drawings:

Figure 1 is a perspective view of a metal boring tool embodying some features of my improvements, the upper part of the tool holder being cut away and the groove forming cutter and the set screw being detached.

Figure 2 shows an elevation of the lower part of the tool with the groove forming cutter removed and illustrating how the drilling bit forms a relatively small hole in the work.

Figure 3 is a perspective view of the tool complete with the upper part of the tool holder cut away.

Figure 4 shows how the tool forms an annular groove in the work.

Figure 5 is a perspective view of the tool equipped with the proper devices for reaming purposes.

Figure 6 illustrates the operation of reaming with my improved tool.

The tool holder A may be of any suitable construction adapting it to be connected with suitable operating mechanism. It carries at its lower end a drill bit B of relatively small diameter adapting it to bore a hole X in the work Z as indicated in Figure 2, where the work is shown resting on a suitable support W. The tool holder is formed with an angular hole $a$, which extends transversely through it, adapting it to receive the angular shank $c$ of the L-shaped cutter C, the lower end of which is formed with a cutting edge $c'$ adapted to cut an annular groove $x$ around the hole X and to leave between the groove $x$ and the hole X a ring of metal Y. It will of course be understood that the groove $x$ may be continued and the ring completely severed from the work. The cutter C is held in place by a set screw D which is preferably hollow and formed with internal polygonal walls as shown, adapted to receive an angular tightening tool.

By these devices a groove of the desired diameter may be formed or a ring or collar of the desired diameter may be produced.

It will be observed by reference to Figure 4 that the bit B serves as a guide or pilot for the groove cutting device during the operation.

If it be desired to ream the hole, I may withdraw the cutter C and replace it by the cutter E shown in Figure 5, the lower end of which is formed with a cutting edge $e$ adapted to ream the hole. In this case in order to guide or pilot the reaming cutter, I apply to the bit B a ring F of approximately the same diameter as the hole to be reamed and hold it in place by a collar G made fast to the bit by a set screw *g*. The ring F is loosely mounted on the bit so that it does not turn therewith, thus reducing friction and decreasing the operating power. The collar G may be set at any desired elevation on the bit to hold the ring in the proper working position.

It will be observed that I employ a cutter having a cutting edge of small width. In this way friction is reduced and less power is required to operate the tool than if a wide cutter was used. Furthermore, the operation results not only in forming a hole of the required diameter, but a ring or collar is formed which thus saves metal and produces a useful article. The cutter C has its cutting edge made slightly wider than the shank of the tool and this shank is cut away at the rear to provide the desired clearance so that only the extreme lower cutting edge of the tool bears upon the metal. The same is true of the cutter E shown in Figures 5 and 6, only a small part of the cutting edge comes in contact with the metal. In this way, as before stated, comparatively little power is required to perform the operation and thus the speed of operation may be increased.

The tool may be used interchangeably for different kinds of work. For reaming purposes the ring and cutter shown in Figures 5 and 6 are employed by removing the ring F and collar G and substituting a suitable cutter for the cutter E the tool may be used in the manner indicated in Figures 2 and 4 for cutting grooves and rings.

I claim as my invention:

A tool adapted to be used interchangeably for reaming a previously formed hole or for boring a hole and a groove surrounding the hole comprising a tool holder carrying a centrally arranged boring bit, an adjustable L-shaped cutter carried by the tool holder adapted to cut a groove around the bit, a removable pilot ring loosely mounted on the bit and a collar detachably connected with the bit below the ring and which is adjustable vertically thereon to hold the ring at the desired elevation.

In testimony whereof, I have hereunto subscribed my name.

FLETCHER F. BABCOCK.